United States Patent Office 3,562,275
Patented Feb. 9, 1971

3,562,275
HETEROCYCLIC N,N'-DIGLYCIDYL
COMPOUNDS
Juergen Habermeier, Allschwil, and Daniel Porret, Binningen, Switzerland, assignors to Ciba Limited, Basel, Switzerland, a corporation of Switzerland
No Drawing. Filed July 24, 1969, Ser. No. 844,603
Claims priority, application Switzerland, Aug. 2, 1968, 11,641/68
Int. Cl. C07d 51/30
U.S. Cl. 260—260      4 Claims

ABSTRACT OF THE DISCLOSURE

New 1,3-diglycidyl-5,5-dialkyl-5,6-dihydro-uracils (1,3-diglycidyl-5,5-dimethyl-5,6-dihydro-uracil and 1,3-diglycidyl - 5,5 - dimethyl-6-isopropyl-5,6-dihydro-uracil) are prepared by the reaction, known per se, of 5,5-dialkyl-5,6-dihydro-uracil with epichlorohydrin in the presence of a tertiary amine or of a quaternary ammonium salt, followed by dehydrohalogenation with alkali. (The easy access is surprising because the 5-unsubstituted dihydrouracils can be converted only into the monoglycidyl derivatives even when a large excess of epichlorohydrin is used). As a rule, the new diepoxides are liquid-viscous and can be cured with the usual curing agents, such as dicarboxylic acid anhydrides or polyamines to form shaped articles with good mechanical and electrical properties.

Glycidylation of 5-substituted or 6-substituted uracils (2,4-dihydroxy-pyrimidines) gives crystalline diglycidyl compounds which possess good technical use properties as curable epoxide resins.

Glycidylation of 1,1'-methylene-bis-(2,4-dioxohexahydro - pyrimidines) substituted by lower alkyl gives the 3,3'-diglycidyl derivatives which also possess good technical use properties as epoxide resins.

Attempts to obtain the corresponding diglycidyl compounds by treatment of mononuclear dihydrouracils (=2,4 - dioxohexahydropyrimidines) such as 5,6-dihydrouracil or 6-methyl-5,6-dihydrouracil with excess epichlorhydrin according to analogous methods, therefore failed. Only the monoglycidyl compounds, in which the sole glycidyl group was presumably located on the more strongly acid nitrogen atom in the 3-position of the 2,4-dioxo-hexahydropyrimidine ring could be obtained in this way.

It has now surprisingly been found that mononuclear 2,4-dioxo-hexahydropyrimidines in which the C atom in the 5-position of the ring is disubstituted by alkyl groups can be easily converted by treatment with epichlorhydrin or β-methylepichlorhydrin, in the presence of catalysts, and subsequent dehydrohalogenation, in a manner which is in itself known, into the diglycidyl compound or di-β-methylglycidyl compound.

The greater ease of glycidylation of these 5,5-disubstituted 2,4-dioxo-hexahydropyrimidines compared to the less substituted derivatives was unexpected because the two alkyl substituents in the 5-position did not allow any acidification of the ring nitrogen atom in the 1-position to be foreseen.

The only explanation for the observed phenomenon may be based on the better solubility of the 5,5-disubstituted 2,4-dioxo-hexahydropyrimidines in epichlorhydrin or β-methylepichlorhydrin.

The infra-red (IR) and (H-atom)-magnetic nuclear resonance (NMR) spectra show unambiguously that the glycidylation products are 1(N), 3(N')-diglycidyl- or 1(N), 3(N') - di - β-methylglycidyl-5,5-dialkyl-2,4-dioxohexahydropyrimidines. The derivatives may be unsubstituted or alkyl-substituted in the 6-position.

The new diglycidyl compounds are very reactive epoxide resins which with dicarboxylic acid anhydrides already gel from 80° C. onwards and react with polyamines at relatively low temperatures, with curing taking place.

The subject of the present invention are thus new N-heterocyclic N,N'-diglycidyl compounds of formula (I)

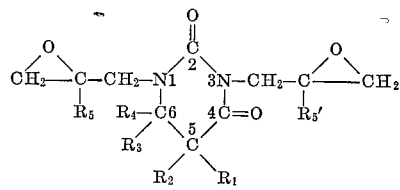

wherein $R_1$ and $R_2$ denote identical or different alkyl residues, preferably alkyl residues with 1 to 4 carbon atoms, $R_3$ and $R_4$ independently of one another each denote a hydrogen atom or an alkyl residue and $R_5$ and $R_5'$ each denote a hydrogen atom or the methyl group.

Preferably the two residues $R_1$ and $R_2$ in the above formula denote methyl groups, $R_3$ is a hydrogen atom or a lower alkyl residue with 1 to 4 carbon atoms and $R_4$ denotes a hydrogen atom.

The new diepoxides are manufactured according to methods which are in themselves known. For this the preferred procedure is that in a compound of formula (II)

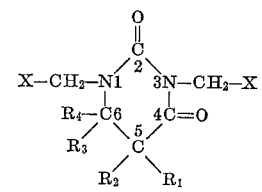

wherein $R_1$, $R_2$, $R_3$, and $R_4$ have the abovementioned significance and the residues X are residues capable of conversion into 1,2-epoxyethyl or 1-methyl-1,2-epoxyethyl residues, these residues X are converted into epoxyethyl or 1-methyl-1,2-epoxyethyl residues.

A residue X which can be converted into the 1,2-epoxyethyl residue is above all a hydroxyhalogenethyl residue which carries the functional groups on different carbon atoms, especially a 2-halogen-1-hydroxyethyl residue or a 2-halogen-1-hydroxy-1-methylethyl residue. Halogen atoms are here especially chlorine or bromine atoms. The reaction takes place in the usual manner, above all in the presence of reagents which split off hydrogen halide, such as strong alkalis, for example anhydrous sodium hydroxide or aqueous sodium hydroxide solution. It is however also possible to employ other strong alkaline reagents such as potassium hydroxide, barium hydroxide, calcium hydroxide, sodium carbonate or potassium carbonate.

A further residue X which can be converted into the 1,2-epoxyethyl residue is for example the vinyl residue which can be converted into the 1,2-epoxyethyl residue in a known manner, such as above all by reaction with hydrogen peroxide or per-acids, for example peracetic, perbenzoic or monoperphthalic acid.

The starting substances of Formula II are obtained in a manner which is in itself known. Thus for example a 5,6-dihydrouracil of formula (III)
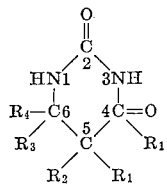

wherein $R_1$, $R_2$, $R_3$ and $R_4$ have the abovementioned significance, can be reacted with a compound of formula $X-CH_2-Hal$, wherein Hal represents a halogen atom and X has the abovementioned significance. Preferably, the compound of Formula III is reacted with an epihalogenohydrin or $\beta$-methylepihalogenohydrin, above all epichlorhydrin or $\beta$-methylepichlorhydrin, in the presence of a catalyst, such as especially a tertiary amine, a quaternary ammonium base or a quaternary ammonium salt. Suitable catalysts for the addition of epichlorhydrin or $\beta$-methylepichlorhydrin are above all tertiary amines such as triethylamine, tri - n - propylamine, benzyldimethylamine, N,N' - dimethylaniline and triethanolamine; quaternary ammonium bases such as benzyltrimethylammonium hydroxide; quaternary ammonium salts such as tetramethylammonium chloride, tetraethylammonium chloride, benzyltrimethylammonium chloride, benzyltrimethylammonium acetate or methyltriethylammonium chloride, hydrazines with a tertiary nitrogen atom such as 1,1-dimethylhydrazine, which can also be employed in a quaternised form; alkali halides such as lithium chloride, potassium chloride, sodium chloride, bromide or fluoride; further, ion exchanger resins with tertiary or quaternary amino groups, and also ion exchangers with acid amide groups. Basic impurities which can occur in technical commercially available forms of the starting compounds (III) can also act as catalysts. In such cases it is not necessary to add a special catalyst.

The invention also relates to those embodiments of the process in which one starts from a compound obtainable as an intermediate product at any stage and carries out the missing stages, or in which a starting substance is formed under the reaction conditions and further processed without isolation.

A preferred embodiment of the process therefore for example consists of reacting an epihalogenohydrin or $\beta$-methylepihalogenohydrin, preferably epichlorhydrin or $\beta$-methylepichlorhydrin in the presence of a catalyst such as preferably a tertiary amine, a quaternary ammonium base or a quaternary ammonium salt, with a compound of Formula III, and in a second stage treating the resulting product containing halogenohydrin groups with reagents which split off hydrogen halide. In these reactions the procedure described above is followed, and the abovementioned compounds can be employed as catalysts for the addition of epihalogenohydrin or $\beta$-methylepihalogenohydrin and for the dehydrohalogenation. Here particularly good yields are obtained if an excess of epichlorhydrin or $\beta$-methylepichlorhydrin is used. During the first reaction, before the addition of alkali, a partial epoxidation of the dichlorhydrin or of the dichloro-$\beta$-methylhydrin of the dihydrouracil already takes place. The epichlorhydrin or the $\beta$-methylepichlorhydrin, which act as hydrogen chloride acceptors, have then been partially converted into glycerine-dichlorhydrin or into $\beta$-methylglycerine-dichlorhydrin.

The manufacture of the N,N'-diglycidyl compounds succeeds particularly easily according to the process described above when starting from dihydrouracils of formula (IV)
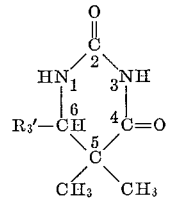

wherein $R_3'$ is a hydrogen atom or an alkyl residue having 1 to 4 carbon atoms.

5,6-dihydrouracils of Formula IV are 5,5-dimethyl-5,6-dihydrouracil (=2,4-dioxo-5,5-dimethylhexahydropyrimidine) and 5,5 - dimethyl - 6 - isopropyl-5,6-dihydrouracil (=2,4 - dioxo-5,5-dimethyl-6-isopropyl-hexahydropyrimidine).

The addition of the epihalogenohydrin or of the $\beta$-methylepihalogenohydrin to the dihydrouracils can here be effected according to known processes, with or without solvents, with a small or larger excess of epihalogenohydrin or $\beta$-methylepihalogenohydrin, at temperatures up to 140° C., under the catalytic action of tertiary amines, quaternary ammonium salts, alkali halides and other anionically active catalysts, in 30 to 360 minutes. The subsequent dehydrohalogenation can take place at 40 to 70° C. with solid or liquid alkalis and optionally with the resulting water being azeotropically distilled off. The alkali halide is separated off according to known processes. The resulting 1,3-diglycidyl-dihydrouracil or 1,3-di-$\beta$-methylglycidyl-dihydrouracil derivatives are isolated by distilling off the excess of epihalogenohydrin or $\beta$-methylepihalogenohydrin and distilling off the solvent where relevant. Colourless to pale yellowish-coloured liquid diglycidyl compounds are obtained in yields of up to 100% of theory and having almost theoretical epoxide contents. The new diglycidyl compounds obtained can be purified by vacuum distillation.

The diepoxides of Formula I according to the invention react with the usual curing agents for epoxide compounds. They can therefore be crosslinked or cured by the addition of such curing agents, analogously to other polyfunctional epoxide compounds. Basic or acid compounds are possible curing agents of this kind.

The following may for example be mentioned as suitable curing agents: amines or amides, such as aliphatic, cycloaliphatic or aromatic, primary, secondary and tertiary amines, for example monoethanolamine, ethylene-diamine, hexamethylenediamine, trimethylhexamethylene-diamine, diethylenetriamine, triethylenetetramine, tetraethylenepentamine, N,N-dimethylpropylenediamine-1,3-N,N-diethylpropylenediamine-1,3, 2,2 - bis-(4'-aminocyclohexyl)-propane, 3,5,5 - trimethyl-3-(aminomethyl)-cyclohexylamine ("isophoronediamine"), Mannich bases such as 2,4,6-tris-(dimethylaminomethyl)-phenol; m-phenylenediamine, p-phenylenediamine, bis-(4-aminophenyl)methane, bis-(4-aminophenyl)-sulphone and m-xylylenediamine; adducts of acrylonitrile or monoepoxides, such as ethylene oxide or propylene oxide, to polyalkylene-polyamides, such as diethylenetriamine or triethylenetetramine; adducts of polyamines, such as diethylenetriamine or triethylenetetramine in excess and polyepoxides such as diomethane-polyglycidyl ethers; ketimines, for example from acetone or methyl ethyl ketone and bis-(p-aminophenyl)-methane; adducts from monophenols or polyphenols and polyamines, polyamides, especially those from aliphatic polyamines, such as diethylenetriamine or triethylenetetramine, and dimerised or trimerised unsaturated fatty acids, such as dimerised linseed oil fatty acid ("Versamid"); polymeric polysulphides ("Thiokol"); dicyandiamide, aniline-formaldehyde resins; polyhydric phenols, for example resorcinol, 2,2-bis-(4-hydroxyphenol)-propane or phenol-formaldehyde resins; boron trifluoride and its complexes with organic compounds, such as BF$_3$-ether complexes and BF$_3$-amine complexes, for example BF$_3$-monoethylamine complex; acetoanilide-BF$_2$-complex; phosphoric acid; triphenylphosphite; polybasic carboxylic acids and their anhydrides, for example phthalic anhydride, $\Delta^4$-tetrahydrophthalic anhydride, hexahydrophthalic anhydride, 4-methylhexahydrophthalic anhydride, 3,6-endomethylene-$\Delta^4$-tetrahydrophthalic anhydride, 4-methyl-3,6-endomethylene-$\Delta^4$- tetrahydrophthalic anhydride (=methylnadicanhydride), 3,4,5,6,7,7-hexachlor-3-,6-endomethylene-$\Delta^4$-tetrahydrophthalic anhydride, succinic anhydride, adipic anhydride, azaleic anhydride, sebacic anhydride, maleic anhydride, dodecenyl-succinic anhydride; pyromellitic acid dianhydride or mixtures of such anhydrides.

Cure accelerators can furthermore be employed during the cure, and in particular when using polyamides, dicyandiamides, polymeric polysulphides or polycarboxylic acid anhydrides as curing agents; such accelerators are for example: tertiary amines, their salts or quaternary ammonium compounds, for example 2,4,6-tris-(dimethyl-aminomethyl)-phenol, benzyldimethylamine, 2-ethyl-4-methyl-imidazole, 4-aminopyridine or triamylammonium phenolate; tin$^{II}$-acylates such as tin$^{II}$-octoate or alkali metal alcoholates such as for example sodium hexane triolate.

The term "cure" as used here denotes the conversion of the above diepoxides into insoluble and infusible cross-linked products, and in fact as a rule with simultaneous shaping to give shaped articles such as castings, pressings or laminates, or to give two-dimensional structures such as coatings, lacquer films or adhesive bonds.

If desired, active diluents such as for example styrene oxide, butyl glycidyl ether, isooctyl glycidyl ether, phenyl glycidyl ether, cresyl glycidyl ether, glycidyl esters of synthetic highly branched mainly tertiary aliphatic mono-carboxylic acids ("Cardura E"), or cycloaliphatic monoepoxides such as 3-vinyl-2,4-dioxaspiro-(5.5)-9,10-epoxyundecane can be added to the diepoxides according to the invention in order to lower the viscosity.

The diepoxides according to the invention can furthermore be used mixed with other curable diepoxide or polyepoxide compounds. As such, the following may for example be mentioned: polyglycidyl ethers of polyhydric alcohols such as 1,4-butanediol, polyethylene glycols, polypropylene glycols or 2,2-bis-(4'-hydroxycyclohexyl)-propane; polyglycidyl ethers of polyhydric phenols such as 2,2 - bis-(4'-hydroxyphenyl)-propane (=diomethane), 2,2-bis-(4'-hydroxy-3',5'-dibromophenyl)-propane, bis-(4-hydroxyphenyl) - sulphone, 1,1,2,2-tetrakis - (4'-hydroxyphenyl)-ethane or condensation products of formaldehyde with phenols manufactured in an acid medium, such as phenol-novolacs or cresol-novolacs; further, di- or poly-($\beta$-methylglycidyl)-ethers of the polyalcohols and polyphenols quoted above; polyglycidyl esters of polycarboxylic acids, such as for example phthalic acid diglycidyl ester, tetrahydrophthalic acid diglycidyl ester or hexahydrophthalic acid diglycidyl ester; triglycidyl isocyanurate, N,N'-diglycidyl-5,5-dimethylhydantoin, aminopolyepoxides such as are obtained by dehydrohalogenation of the reaction products of epihalogenohydrin and primary or secondary amines, such as aniline of 4,4'-diaminodiphenylmethane; further, alicyclic compounds containing several epoxide groups, such as vinylcyclohexene diepoxide, dicyclopentadiene diepoxide, ethylene-glycol-bis-(3,4-epoxytetrahydrodicyclopentadien-8-yl)-ether, bis-(3,4-epoxycyclohexylmethyl) - adipate, (3',4'-epoxycyclohexylmethyl) - 3,4-epoxycyclohexanecarboxylate, (3',4'-epoxy - 6' - methylcyclohexylmethyl)-3,4-epoxy-6-methylcyclohexanecarboxylate, bis-(cyclopentyl)-ether diepoxide or 3-(3',4'-epoxycyclohexyl) - 2,4-dioxaspiro-(5.5)-9,10-epoxyundecane.

A further subject of the present invention are therefore curable mixtures which are suitable for the manufacture of shaped articles including two-dimensional structures and which contain the polyepoxides according to the invention, optionally together with other diepoxide or polyepoxide compounds and, furthermore, curing agents for epoxide resins such as polyamines or polycarboxylic acid anhydrides.

The N,N'-diglycidyl-dihydrouracils according to the invention, or their mixtures with other polyepoxide compounds and/or curing agents, can furthermore be mixed, in any stage before cure, with usual modifiers such as extenders, fillers and reinforcing agents, pigments, dyestuffs, organic solvents, plasticizers, flow control agents, agents for conferring thixotropy, flameproofing substances, or mould release agents.

As extenders, reinforcing agents, fillers and pigments which can be employed in the curable mixtures according to the invention, the following may for example be mentioned: coal tar, bitumen, glass fibres, boron fibres, carbon fibres, cellulose, polyethylene powder, polypropylene powder, mica, asbestos, quartz powder, slate powder, aluminum oxide trihydrate, chalk powder, gypsum, antimony trioxide, bentones, silica aerogel ("Aerosil"), lithopone, barytes, titanium dioxide, carbon black, graphite, iron oxide or metal powders such as aluminum powder or iron powder.

The following are for example suitable for use as organic solvents for modifying the curable mixtures: toluene, xylene, n-propanol, butyl acetate, acetone, methyl ethyl ketone, diacetone-alcohol, ethylene glycol-monomethyl ether, -monoethyl ether and -monobutyl ether.

As plasticisers for modifying the curable mixtures, dibutyl, dioctyl and dinonyl phthalate, tricresyl phosphate, trixylenyl phosphate and also polypropylene glycols can for example be employed.

Particularly for use in the lacquer field, the new N,N'-diglycidyl-dihydrouracils can be partially or completely esterified in a known manner with carboxylic acids, such as especially higher unsaturated fatty acids. It is furthermore possible to add other curable synthetic resins, for example phenoplasts or aminoplasts, to such lacquer resin formulations.

The curable mixtures can serve, in the filled or unfilled state, optionally in the form of solutions or emulsions, as laminating resins, paints, lacquers, dipping resins, impregnating resins, casting resins, compression-moulding compositions, sintering powders, spreading and filling compositions, floor covering compositions, potting and insulating compositions for the electrical industry, and adhesives, as well as for the manufacture of such products.

The mixtures of 1,3-diglycidyl-5,5-dimethyl-5,6-dihydrouracils with polyamines or polycarboxylic acid anhydrides particularly represent very reactive resin/curing agent systems.

Cured mouldings from these resins show good heat stability and good electrical properties coupled with good mechanical properties.

In the examples which follow parts denote parts by weight and percentages denote percentages by weight.

(I) EXAMPLES OF MANUFACTURE

Example 1

A mixture of 36.85 g. of 2,4-dioxo-5,5-dimethyl-6-isopropyl-hexahydropyrimidine (0.2 mols), 222.0 g. of epichlorhydrin (2.4 mols) (corresponding to a 6-fold molar excess per NH group) and 0.6684 g. of tetraethylammonium chloride (2 mol percent) is stirred intensively for 2½ hours at 90° C. A clear colourless solution is already produced from the initially white suspension after 75 minutes.

The reaction mixture is then cooled to 60° C. and 36.82 g. of 50% strength aqueous sodium hydroxide solution (0.46 mols) (corresponding to a 15% stoichiometric excess relative to the theoretical consumption) are added dropwise over the course of 60 minutes with vigorous stirring and under a slight vacuum, with the water present in the reaction mixture being simultaneously removed by azeotropic circulatory distillation under 40–

60 mm. Hg. The mixture is now cooled to room temperature and the resulting sodium chloride is removed by filtration. The salt is washed with 50 ml. of epichlorhydrin and the combined epichlorhydrin solutions are extracted by shaking with 100 ml. of water in order to remove catalyst residues. After separating off the aqueous phase the epichlorhydrin solution is concentrated in a waterpump vacuum at 60° C. bath temperature until no further epichlorhydrin distills off. Thereafter the residue is further treated at 0.1 mm. Hg (60° C.) until the last traces of volatile constituents have been removed.

A liquid, clear and transparent, orange-yellow technical epoxide resin consisting mainly of 1,3-diglycidyl-2,4-dioxo-5,5-dimethyl-6-isopropyl-hexahydropyrimidine is obtained in 91.2% yield (54.0 g.). The crude product contains 6.54 epoxide equivalents per kg. (=96.7% of theory) and 1.4% of chlorine.

For purification, the crude product can be distilled; the boiling point is between 166 and 168° C. at 0.1 mm. Hg. The colourless distillate has an epoxide content of 6.63 epoxide equivalents/kg. (=97.9% of theory); the viscosity is 6900 cp. at 25° C.

Elementary analysis shows the following.—Calculated (percent): C, 60.79; H, 8.16; N, 9.45; Cl, 0. Found (percent): C, 60.00; H, 8.20; N, 9.43; Cl, 0.9.

Molecular weight determination:

M (from vapour pressure osmosis) _____ 297.0
M (from mass spectrum) _____ 296.0
M (theory) _____ 296.4

The new diglycidyl compound is miscible with many organic solvents such as methanol, ethanol, acetone, methylene chloride, chloroform, epichlorhydrin, tetrahydrofuran and the like.

The infrared spectrum shows the purity of the 1,3-diglycidyl - 2,4 - dioxo-5,5-dimethyl-6-isopropyl-hexahydropyrimidine through the absence of the NH frequencies at 3.07µ and 3.22µ and the presence of epoxide frequencies. Equally, the H–NMR spectrum proves the structure of the substance through the absence of the originally present —N—H absorptions and through the presence of the proton resonances which originate from the protons of the glycidyl residues.

Example 2

The mix according to Example 1 is repeated but instead of 2 mol percent of tetraethylammonium chloride 5 mol percent (=1.6570 g.) are used and instead of 36.82 g. of 50% strength sodium hydroxide solution 41.80 g. (0.522 mols) are added.

The conduct of the reaction and the isolation of the product takes place exactly as in Example 1.

A clear low-viscosity light brown technical epoxide resin having an epoxide content of 6.34 epoxide equivalents per kg. (corresponding to 93.8% of theory) is obtained in 100% yield (59.2 g.).

Example 3

The mix according to Example 1 is repeated but instead of 2 mol percent of tetraethylammonium chloride only 1 mol percent (0.3342 g.) is used and the mixture is only stirred for 2 hours at 90° C. The working-up and isolation of the 1,3-diglycidyl-2,4-dioxo-5,5-dimethyl-6-isopropyl-hexahydropyrimidine takes place according to Example 1.

A clear pale yellow resin with an epoxide content of 6.14 epoxide equivalents/kg. (90.8% of theory) and a viscosity of 14,900 centipoises at 20° C. is obtained in 91.5% yield (54.2 g.).

Example 4

A mixture of 36.85 g. of 2,4-dioxo-5,5-dimethyl-6-isopropyl-hexahydropyrimidine (0.2 mol), 925.0 g. of epichlorhydrin (10 mols) (corresponding to a 25-fold molar excess per NH group) and 0.6684 g. of tetraethylammonium chloride (2 mol percent) is stirred for 2 hours at 90° C. The mixture is cooled to 60° C. and 27.2 g. of 97% pure sodium hydroxide powder (0.656 mol) are added over the course of 30 minutes in small portions with intensive stirring. After the addition of the alkali the mixture is stirred for a further 10 minutes at 60° C. It is then distilled at 60° C. and about 40 mm. Hg with good stirring until all the water produced during the reaction is azeotropically distilled off.

The resulting sodium chloride is now separated from the solution by filtration and washed with a little epichlorhydrin. The combined epichlorhydrin solutions are extracted by shaking with 80 ml. of water. After separating off the water, the epichlorhydrin solution is concentrated at 60° C. in a water pump vacuum until no further epichlorhydrin distills off. Thereafter the residue is further treated at 0.1 to 0.2 mm. Hg (60° C.) until the last traces of volatile constituents are removed.

55.2 g. of a product (93.3% yield) consisting mainly of 1,3-diglycidyl-2,4-dioxo-5,5-dimethyl - 6 - isopropyl-hexahydropyrimidine, and having an epoxide content of 6.35 epoxide equivalents/kg. (corresponding to 93.9% of theory) are obtained as a clear liquid resin of low viscosity.

Example 5

28.45 g. of 2,4-dioxo-5,5-dimethyl-hexahydropyrimidine (0.2 mol), 740.0 g. of epichlorhydrin (8.0 mols) (corresponding to a 20-fold molar excess per NH group) and 1.3390 g. of tetraethylammonium chloride (4 mol percent are mixed at room temperature and stirred for 2½ hours at 95° C.

Thereafter the mixture is cooled to 60° C. and 41.7 g. of 50% strength aqueous sodium hydroxide solution (0.522 mol) are added dropwise over the course of 1 hour with intensive stirring whilst the water present in the reaction mixture is simultaneously removed by azeotropic circulatory distillation at 40 to 60 mm. Hg. After completion of the addition of the caustic alkali, the mixture is further distilled until no more water separates. It is then cooled to room temperature and the resulting sodium chloride is removed by filtration. The salt is washed with 100 ml. of epichlorhydrin and the combined epichlorhydrin solutions are extracted by shaking with 100 ml. of water to remove catalyst residues. The aqueous layer is separated off and the epichlorhydrin solution is concentrated at 60° C. bath temperature in a water-pump vacuum until no further epichlorhydrin distils off.

Finally, the residue is further exposed to a vacuum of 0.1 to 0.2 mm. Hg at 60° C. until the last volatile constituents are removed.

47.3 g. of a light yellow liquid technical epoxide resin (93.1% of theory) consisting mainly of 1,3-diglycidyl-2,4-dioxo-5,5-dimethyl - hexahydropyrimidine and having an epoxide content of 6.89 epoxide equivalents/kg. (corresponding to 84.4% of theory) are produced. This technical product can also be purified by vacuum distillation; the distilled product boils at 154° C. under 0.1 mm. Hg. The epoxide content of the colourless to pale yellow product is 7.17 epoxide equivalents per kg. (corresponding to 91% of theory); the viscosity is 3000 centipoises at 25° C.

Elementary analysis shows the following.—Calculated (percent): C, 56.68; H, 7.14; N, 11.02; Cl, 0. Found (percent): C, 56.05; H, 7.25; N, 10.74; Cl, 1.01.

Molecular weight determinations show the following:

M (vapour pressure osmosis) _____ 247
M (mass spectrum) _____ 254
M (theory) _____ 254.3

This new diglycidyl compound is miscible with many organic solvents such as methanol, ethanol, acetone, tetrahydrofurane, epichlorhydrin, methylene chloride, chlorform and the like. The infrared and proton-magnetic resonance spectrum can be reconciled with the following structure:

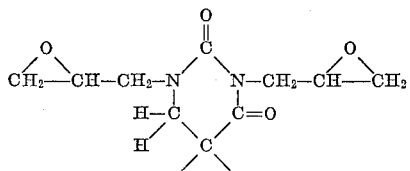

Example 6

A mixture of 129 g. of 2,4-dioxo-5,5-dimethyl-6-isopropyl-hexahydropyrimidine (0.7 mols), 2965 g. of β-methyl-epichlorhydrin (28 mols) and 5.80 g. of tetraethylammonium chloride (5 mol percent is stirred for 4 hours at 118 to 119° C. under reflux. The mixture is then cooled to 60° C. and 156 g. of 50% strength sodium hydroxide solution (1.8 mols) are added dropwise thereto over the course of 2 hours with vigorous stirring; at the same time the water present in the reaction mixture is continuously removed by azeotropic circulatory distillation under a slight waterpump vacuum at 60° C. 100 ml. of water separate (theory 103 ml.). The resulting sodium chloride is separated off by filtration and rinsed with a little β-methylepichlorhydrin. The solution is washed with 150 ml. of water to remove remnants of catalyst and sodium chloride. The aqueous layer is separated off and the organic layer is concentrated at 60° C./15 mm. Hg. Thereafter the residue is further treated at 60° C./10.08 mm. Hg until the last volatile constituents are removed and this is followed by continuously checking the weight.

213.5 g. (93.8% of theory) of a yellowish resin containing 5.59 epoxide equivalents/kg. (90.8% of theory) are obtained. The proton-magnetic resonance spectrum (60 mc. H–NMR, recorded in deuterochloroform) shows, through the signals at δ=0.77; 0.98; 1.09 (the signals are in each case further split up)

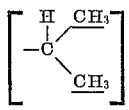

δ=1.20–1.46 (multiplet)

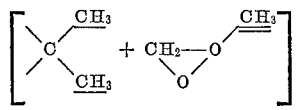

δ=1.75–2.25 (multiplet)

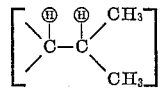

δ=2.50–2.77 (multiplet)

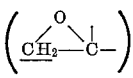

in addition to the signals for the remaining —CH₂— groups, that the following structure is present:

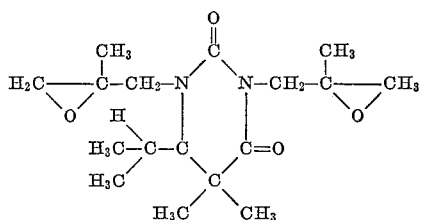

EXAMPLE 7

(a) A mixture of 328.8 g. of 5,5 - dimethyl - 6 - isopropyl - 5,6 - dihydrouracil (=2,4 - dioxo,5,5-dimethyl-6 - isopropyl - hexahydropyrimidine) (1.782 mols), 1900 g. of β - methylepichlorhydrin (17.85 mols) and 8.82 g. of tetraethylammonium chloride is stirred for 3 hours at 75 reflux temperature (115 to 122° C.). A clear colourless solution is thereby produced. The mixture is cooled to 60° C. and 192.5 g. of 50% strength sodium hydroxide solution is thereby produced. The mixture is cooled to 60° C. over the course of 2 hours with vigorous stirring; at the same time water present in the reaction mixture is continuously separated by azeotropic circulatory distillation under a vacuum of 60 to 90 mm. Hg. After completion of the addition of the caustic alkali water is removed from the circulation for a further 30 minutes. The sodium chloride produced in the reaction is then separated off by filtration and rinsed with 50 ml. of β-methylepichlorhydrin. The combined solutions are extracted by shaking with 180 ml. of water to remove remnants of sodium chloride and of catalyst.

After separating off the aqueous layer, the organic phase is concentrated at 60° C./18 mm. Hg and then treated at 60° C./0.1 mm. Hg until the weight remains constant.

A crystalline colourless product containing 3.92 epoxide equivalents/kg. (100% of theory) is obtained; the yield is 432.0 g. (95% of theory).

For purification, the 3 - (β - methylglycidyl) - 5,5-dimethyl - 6 - isopropyl - 5,6-dihydrouracil thus obtained can be recrystallised from water/methanol (5:1). The purified product melts at 106 to 108° C.

Elementary analysis shows the following.—Calculated (percent): C, 61.39; H, 8.72; N, 11.02; Cl, 0.0. Found (percent): C, 61.44; H, 8.54; N, 11.21; Cl, <0.3.

Determination of the molecular weight by vapour pressure osmometry shows a molecular weight of 255 (calculated: 254.32).

The nuclear magnetic resonance spectrum (60 mc. H–NMR, recorded in deuterochloroform) together with the above data proves the structure given below through the presence of the following signals.

1 proton at δ=6.72  N₁—H  (for N₃H δ would be>10.0)

2 protons at δ=3.45–4.20  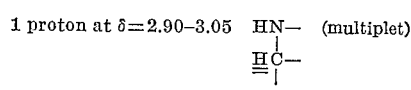 (multiplet)

1 proton at δ=2.90–3.05  HN— (multiplet)
HC—

2 protons at =2.47–2.80  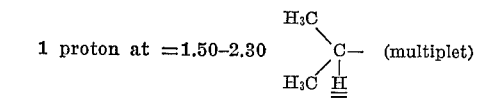 (quartet)

1 proton at =1.50–2.30  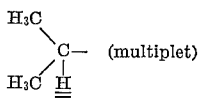 (multiplet)

9 protons at =1.23–1.50  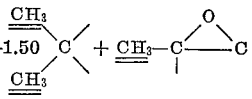

6 protons at =0.66
       =0.78
       =0.91   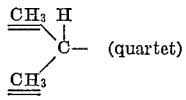 (quartet)
       =1.03

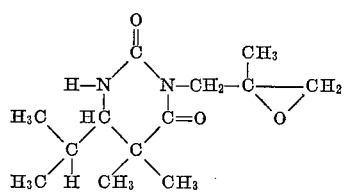

(b) A mixture of 398.0 g. of 3 - (β - methylglycidyl)-5,5 - dimethyl - 6 - isopropyl-5,6-dihydrouracil (1.561 mols) (manufactured according to example 7 (a), 2210 g. of epichlorohydrin (23.85 mols) and 8.00 g. of tetraethylammonium chloride is stirred for 3 hours at 90° C. 162.5 g. of 50% strength sodium hydroxide solution (2.03 mols) are then slowly added dropwise at 60° C. over the course of 2 hours with vigorous stirring, and at the same time the water present in the reaction mixture is continuously separated by azeotropic circulatory distillation under a vacuum of 75 to 90 mm. Hg. After completion of the addition of the caustic alkali, water is removed from the circulation for a further 40 minutes. The sodium chloride formed during the reaction is now separated off by filtration and washed with 100 ml. of epichlorhydrin. The combined solutions are extracted by shaking with 210 ml. of water to remove sodium chloride and catalyst remnants. The aqueous phase is separated off and the organic layer is concentrated at 60° C./20 mm. Hg. The resulting resin is treated at 60° C./0.1 mm. Hg until it reaches constant weight.

421.5 g. of crude 1-glycidyl-3-($\beta$-methylglycidyl)-5,5-dimethyl-6-isopropyl-5,6-dihydrouracil (87.0% of theory) are obtained; the epoxide content is 5.92 equivalent/kg. (corresponding to 92.4% of theory). The chlorine content of the crude product is 2.0%.

For purification, the product may be distilled. At 172 to 174° C. the substance boils under a vacuum of 0.55 mm. Hg. The distillate is a colourless oil having an epoxide content of 6.09 epoxide equivalents/kg. (94.8% of theory). The nuclear magnetic resonance spectrum (60 mc. H–NMR, recorded in deuterochloroform) now shows, through the absence of the $N_1$–H signals at $\delta=6.72$ and through the following signals, that 1-glycidyl-3-($\beta$-methylglycidyl)-5,5-dimethyl-6 - isopropyl-5,6-dihydrouracil having the formula given below has been produced.

6 protons at $\delta=0.75-1.10$ (quartet with fine structure)

3 protons at $\delta=1.28-1.41$

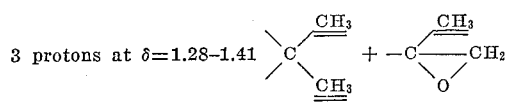

1 proton at $\delta=1.70-2.30$ (multiplet)

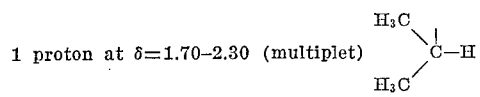

4 protons at $\delta=2.48-2.88$ (multiplet)

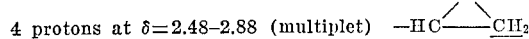

1 proton at $\delta=2.92-3.10$ (multiplet)

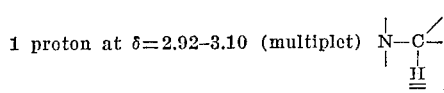

1 proton at $\delta=3.15-3.38$ (multiplet)

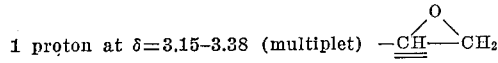

4 protons at $\delta=3.44-4.80$ (multiplet)

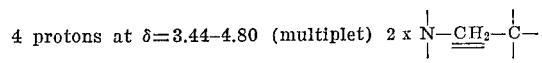

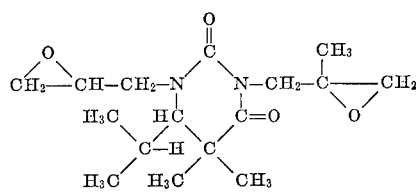

(II) USE EXAMPLES

Example A 164 g. of the technical epoxide resin manufactured according to Example 1, which mainly consists of 1,3-diglycidyl-2,4-dioxo-5,5 - dimethyl-6-isopropyl-hexahydropyrimidine and has an epoxide content of 6.54 epoxide equivalents/kg., are mixed at 50° C. with 133.8 g. of hexahydrophthalic anhydride. This homogeneous mixture is warmed to 70° C., briefly exposed to a vacuum of 10 mm. Hg and then poured into aluminium moulds prewarmed to 80° C. The mixture is cured in accordance with the following temperature programme: 2 hours at 80° C., 2 hours at 100° C., 1 hour at 120° C. and 15 hours at 150° C. The mixture gels within 40 to 60 minutes at 80° C. The mouldings thus produced are clear and transparent, and pale yellow to light brownish-orange in colour; they show the following properties:

Tracking resistance (VDE 0303) --- level KA3c.
Arcing resistance (VDE 0303) ---- level L4.
Breakdown voltage (VDE 0303) ---- 195 kv./cm.
Volume resistance at 20° C. (VDE 0303) ------ $1.10^{17}$ $\Omega \times$cm.
Dielectric loss factor Tg $\delta$ (50 Hz.)
  at 60° C. -------------------- 0.005.
  at 100° C. ------------------- 0.006.
Dielectric constant ($\epsilon$) (DIN 53,483)
  at 25° C. -------------------- 3.45.
  at 100° C. ------------------- 3.50.
  at 140° C. ------------------- 3.60.
Flexural strength (VSM 77,103) --- 9.9 mg./mm.$^2$.
Deflection (VSM 77,103) --------- 6.6 mm.
Heat distortion point according to Martens (DIN 53,458) --------- 146° C.
Water absorption after water storage 4 days at 20° C. ------------ 0.44%.

Example B 45 g. of the technical epoxide resin used in Example A (1,3-diglycidyl-2,4-dioxo-5,5-dimethyl-6-isopropyl-hexahydropyrimidine) with an epoxide content of 6.54 epoxide equivalents/kg. are mixed with 54 g. of anhydride mixture, which is liquid at room temperature, of 9 parts of phthalic anhydride, 13 parts of tetrahydrophthalic anhydride, 78 parts of hexahydrophthalic anhydride and 15 parts of cresylglycide, and warmed to 70° C. The mixture is briefly exposed to a vacuum of 10 mm. Hg and is then poured into an aluminum mould at 80° C. The curing takes place in accordance with the temperature programme mentioned in Example A. Gelling takes place within 20 to 30 minutes at 80° C. The cured moulding is clear and transparent, and yellow in colour.

Testing yielded the following values:

Flexural strength (VSM) ------ 9.3 kg./mm.$^2$.
Deflection (VSM) ----------- 5.6 mm.
Impact strength (VSM) ------ 7.34 cm. kg./cm.$^2$
Heat distortion point according to Martens (DIN) --------- 109° C.
Cold water absorption (4 days/ 20° C.) ------------------ 0.29%.

Example C 60 parts of the technical epoxide resin used in example A (1,3-diglycidyl-2,4-dioxo-5,5-dimethyl-6-isopropylhexahydropyrimidine) with an epoxide content of 6.54 epoxide equivalents/kg., are mixed at 20° C. with 9.0 g. of triethylenetetramine and then poured into an aluminum mould which stands in a waterbath at 15° C. Curing takes place for 3 days at 15° C. followed by a post-cure for 5 hours at 60° C. A pale yellow to colourless, clear and transparent moulding having the following properties is produced:

Flexural strength (VSM) ------ 9.21 kg./mm.$^2$.
Deflection at break --------- 6.0 mm.
Impact strength (VSM) ------ 5.59 cm. kg./cm.$^2$ In a comparison experiment, the cold cure is performed without external cooling of the mould; here the mixture becomes so intensely heated that an explosion-like cure takes place within 15 minutes with partial decomposition of the substances. This again shows the high reactivity of these new resins.

Example D 57.1 g. of the technical epoxide resin manufactured according to Example 5 (1,3-diglycidyl-2,4-dioxo-5,5-dimethylhexahydropyrimidine) with an epoxide content of 6.89 epoxide equivalents/kg. are mixed at 60° C. with 47.2 g. of hexahydrophthalic anhydride. The clear homogeneous mixture is warmed to 70° C., briefly exposed to a vacuum of 10 mm. Hg and then poured into aluminium moulds prewarmed to 80° C. Curing takes place in accordance with the temperature programme indicated in Example A. The mouldings thus obtained are light ochre in colour, clear and transparent, and show the following properties:

| | |
|---|---|
| Flexural strength (VSM) | 16.60 kg./mm.² |
| Deflection at break | 9.9 mm. |
| Impact strength (VSM) | 5.83 cm./kg./cm.² |
| Heat distortion point according to Martens (DIN) | 124° C. |
| Cold water absorption (4 days, 20° C.) | 0.49%. |
| Tracking resistance (VDE) | level KA3c. |
| Arcing resistance (VDE) | level L4. |
| Breakdown voltage (instantaneous) | 187 kv./cm. |
| Volume resistance at 20° C. | $4.10^{16} \Omega \times cm.$ |
| Dielectric constant $\epsilon_r$ (DIN) at 20° C. | 3.50. |
| at 100° C. | 3.54 |
| Dielectric loss factor Tg δ (50 Hz.) at 20° C. | 0.006. |

Example E 158 g. of the technical epoxide resin used in Example D (1,3-diglycidyl-2,4-dioxo-5,5-dimethyl-hexahydropyrimidine) with an epoxide content of 6.89 epoxide equivalents/kg. are mixed at 50° C. with 190 g. of anhydride mixture, which is liquid at room temperature, of 9 parts of phthalic anhydride, 13 parts of tetrahydrophthalic anhydride, 78 parts of hexahydrophthalic anhydride and 15 parts of cresylglycide. The homogeneous mixture is warmed to 70° C., briefly exposed to a vacuum of 10 mm. Hg and poured into aluminium moulds prewarmed to 80° C. Curing takes place in accordance with the temperature programme according to Example A. The castings thus obtained are clear and transparent and show the following properties:

| | |
|---|---|
| Flexural strength (VSM) | 8.90 kg./mm.² |
| Deflection at break | 5.0 mm. |
| Impact strength (VSM) | 6.15 cm. kg./cm.² |
| Heat distortion point according to Martens (DIN) | 106° C. |
| Cold water absorption (4 days, 20° C.) | 0.35%. |
| Tracking resistance (VDE) | level KA3c. |
| Arcing resistance (VDE) | level L4. |
| Volume resistance at 22° C. | $9.3 \times 10^{16} \Omega \times cm.$ |
| Dielectric constant $\epsilon$ (DIN) at 25° C. | 3.35. |
| at 100° C. | 3.40. |

Example F

A mixture of 137 parts of the technical epoxide resin used in Example D (1,3-diglycidyl-2,4-dioxo-5,5-dimethyl-hexahydropyrimidine) with an epoxide content of 6.89 equivalents/kg. and 22.5 parts of triethylenetetramine is processed and cured as described in Example C. Pale yellow, glass-clear mouldings with the following properties are produced.

| | |
|---|---|
| Flexural strength (VSM) | 15.6 kg./mm.² |
| Deflection (VSM) | 3.8 mm. |
| Impact strength (VSM) | 5.9 cm. kg./cm.² |
| Heat distortion point according to Martens (DIN) | 89° C. |
| Volume resistance at 20° C. | $3.3 \times 10^{15} \Omega \times cm.$ |
| Arcing resistance (VDE) | level L4. |
| Tracking resistance (VDE) | level KA3b. |

Example G

The resin/curing agent mixture described in Example B is cured in 3 hours at 80° C. and in 15 hours at 115° C. (instead of 2 hours at 80° C. and 2 hours at 100° C. and 1 hour at 120° C. and 15 hours at 150° C.). The pale yellow-coloured casting thus obtained shows the following properties:

| | |
|---|---|
| Flexural strength (VSM) | 10.2 kg./mm.² |
| Deflection (VSM) | 6.3 mm. |
| Impact strength (VSM) | 6.5 cm. kg./cm.² |
| Heat distortion point according to Martens (DIN) | 101° C. |
| Cold water absorption (4 days/20° C.) | 0.22%. |

This result again shows that the new diglycidyl compounds are very reactive and completely cure with anhydrides even at relatively low temperatures (115° C.).

Example H 240 parts of the technical epoxide resin used in example A (1,3-diglycidyl-2,4-dioxo-5,5-dimethyl-6-isopropyl-hexahydropyrimidine) with an epoxide content of 6.54 equivalents/kg. are kneaded in a double bowl kneader with 90 parts of hexahydrophthalic anhydride, 10 parts of calcium stearate and 660 parts of burnt kaolin to give a homogeneous mixture. The compression moulding composition thus obtained was compression-moulded at 150° C. and a pressure of 500 kg./cm.² and showed the following properties:

| | |
|---|---|
| Flexural strength (DIN 53,452) | 460.1 kg./cm.² |
| Impact strength (DIN 53,453) | 2.11 cm. kg./cm.² |
| Notched impact strength (DIN 53,453) | 1.44 cm. kg./cm.² |
| Heat distortion point according to Martens (DIN) | 62° C. |
| Cold water absorption (24 hours/20° C.) | 0.12%. |
| Boiling water absorption (10 minutes) | 0.22%. |

Example I 59.2 g. of the 1-glycidyl-3-(β-methylglycidyl)-5,5-dimethyl-6-isopropyl-5,6-dihydrouracil manufactured according to Example 7, with an epoxide content of 5.92 equivalents/kg., are mixed with 41.0 g. of a polyaminoamide curing agent (amine number 500, viscosity 220 cp./25° C.) at room temperature and poured into an aluminium mould (14 x 4 x 1.2 cm., wall thickness 0.1 mm.). Curing takes place in 10 hours at 40° C.+8 hours at 70° C.+5 hours at 120° C.+1½ hours at 180° C. The clear and transparent light brown moulding shows the following mechanical properties:

| | |
|---|---|
| Flexural strength (VSM) | 10.36 kg./mm.² |
| Deflection (VSM) | 3.1 mm. |
| Impact strength | 5.28 cm. kg./cm.² |

Example J 242 g. of the 1-glycidyl-(β-methylglycidyl) resin used in Example I are mixed at room temperature with 35.2 g. of triethylenetetramine and poured into aluminium moulds (13.5 x 13.5 x 0.4 cm. and 13.5 x 13.5 x 0.2 cm., wall thickness 0.4 cm.). Curing took place in accordance with the temperature programme mentioned in Example I.

The light yellow, clear and transparent, mouldings show the following mechanical properties:

Flexural strength (VSM) _____ 7.02 kg./mm.²
Deflection (VSM) _____ 5.0 mm.
Impact strength (VSM) _____ 4.04 cm. kg./cm.²

What is claimed is:
1. A heterocyclic N,N'-diglycidyl compound of formula

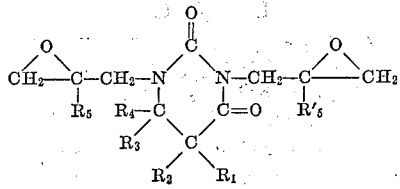

wherein $R_1$ and $R_2$ each represent alkyl with 1 to 4 carbon atoms, $R_3$ and $R_4$ each represent hydrogen atom or an alkyl with 1 to 4 carbon atoms and $R_5$ and $R_5'$ each represent a hydrogen atom or the methyl group.

2. 1,3-diglycidyl-5,5-dimethyl-5,6-dihydro-uracil.
3. 1,3-diglycidyl-5,5-dimethyl-6-isopropyl-5,6-dihydro-uracil.
4. 1,3-di-(β-methylglycidyl)-5,5-dimethyl-6-isopropyl-5,6-dihydro-uracil.

References Cited

UNITED STATES PATENTS 3,503,979  3/1970  Habermeier et al. ____ 260—260

ALEX MAZEL, Primary Examiner
A. M. TIGHE, Assistant Examiner

U.S. Cl. X.R.

260—2, 37, 57, 69, 72, 78